United States Patent
Zacharias

(10) Patent No.: US 12,548,324 B2
(45) Date of Patent: Feb. 10, 2026

(54) METHODS AND SYSTEMS FOR DYNAMICALLY MODIFYING METADATA WHILE SERVING IMAGES

(71) Applicant: Zebrafish Labs, Inc., San Francisco, CA (US)

(72) Inventor: Christopher Zacharias, San Francisco, CA (US)

(73) Assignee: Zebrafish Labs, Inc., San Francisco, CA (US)

( * ) Notice: Subject to any disclaimer, the term of this patent is extended or adjusted under 35 U.S.C. 154(b) by 277 days.

(21) Appl. No.: 18/045,794

(22) Filed: Oct. 11, 2022

(65) Prior Publication Data

US 2023/0403362 A1 Dec. 14, 2023

Related U.S. Application Data

(60) Provisional application No. 63/255,345, filed on Oct. 13, 2021.

(51) Int. Cl.
| | | |
|---|---|---|
| *H04N 1/32* | (2006.01) | |
| *G06F 16/58* | (2019.01) | |
| *G06V 10/70* | (2022.01) | |
| *G06V 10/94* | (2022.01) | |
| *G06V 20/30* | (2022.01) | |

(52) U.S. Cl.
CPC ............. *G06V 20/30* (2022.01); *G06F 16/58* (2019.01); *G06F 16/5866* (2019.01); *G06V 10/70* (2022.01); *G06V 10/95* (2022.01); *H04N 1/32128* (2013.01); *G06V 2201/10* (2022.01); *H04N 2201/3225* (2013.01)

(58) Field of Classification Search
None
See application file for complete search history.

(56) References Cited

U.S. PATENT DOCUMENTS

| | | | | |
|---|---|---|---|---|
| 7,966,551 B2* | 6/2011 | Plastina | ............... | G06F 16/583 |
| | | | | 715/727 |
| 8,798,401 B1* | 8/2014 | Johnson | ............... | G06V 40/172 |
| | | | | 382/305 |

(Continued)

OTHER PUBLICATIONS

"Geolocation Home", Geolocation.com, Oct. 4, 2021, accessed Aug. 5, 2025 via <https://www.geolocation.com/> through <https://web.archive.org/web/20211004155515/https://www.geolocation.com/>.

*Primary Examiner* — Akwasi M Sarpong
*Assistant Examiner* — Pawan Dhingra
(74) *Attorney, Agent, or Firm* — Perkins Coie LLP; Colin Fowler; Anni Siitonen

(57) ABSTRACT

Disclosed herein are methods and systems for dynamically serving image metadata. The method includes receiving, at an image service system from a client system, a request for obtaining an image. The image is associated with inherent metadata. The method includes serving, by the image service system, the image to the client system in response to the request for obtaining the image. While serving the image to the client system, the method includes modifying, by the image service system, the inherent metadata associated with the image that is served to the client system in accordance with a predetermined criterion. The inherent metadata of the image stored by the image service system is not modified and the predetermined criterion is based on a context associated with the request of the image.

14 Claims, 10 Drawing Sheets

(56) References Cited

U.S. PATENT DOCUMENTS

| | | | | |
|---|---|---|---|---|
| 8,856,105 | B2* | 10/2014 | Gargi | G06F 16/58 707/722 |
| 9,373,076 | B1* | 6/2016 | Appelman | G06F 16/9535 |
| 10,019,136 | B1* | 7/2018 | Ozog | H04L 51/48 |
| 2003/0028801 | A1 | 2/2003 | Liberman et al. | |
| 2008/0137963 | A1* | 6/2008 | Chevallier | H04N 5/913 382/206 |
| 2013/0235072 | A1* | 9/2013 | Longhurst | H04N 1/644 345/605 |
| 2014/0280244 | A1* | 9/2014 | Schwartz | G06F 16/29 707/752 |
| 2015/0074107 | A1* | 3/2015 | Johnson | G06F 18/22 707/736 |
| 2015/0124107 | A1* | 5/2015 | Muriello | H04N 21/440263 348/207.1 |
| 2015/0154231 | A1* | 6/2015 | Rodriguez | G06T 1/0021 382/100 |
| 2015/0310126 | A1* | 10/2015 | Steiner | G06F 16/9574 715/204 |
| 2016/0034717 | A1* | 2/2016 | Keohane | G06F 21/6254 726/1 |
| 2016/0047827 | A1* | 2/2016 | Trevisan | G01N 27/023 436/69 |
| 2016/0065949 | A1* | 3/2016 | Lakshminarayan | H04N 13/302 348/51 |
| 2016/0140146 | A1* | 5/2016 | Wexler | G06F 16/5846 707/741 |
| 2016/0299664 | A1* | 10/2016 | Khouri | G06F 3/04845 |
| 2016/0344834 | A1* | 11/2016 | Das | H04L 67/1097 |
| 2018/0052832 | A1* | 2/2018 | Anglin | G06F 40/58 |
| 2018/0352266 | A1* | 12/2018 | Ericson | H04N 21/2347 |
| 2021/0264195 | A1 | 8/2021 | Ingram et al. | |
| 2021/0407100 | A1* | 12/2021 | Sternig | G06T 7/168 |
| 2022/0318432 | A1* | 10/2022 | Taschek | G06F 21/64 |
| 2022/0374190 | A1* | 11/2022 | Rothera | H04M 7/0027 |
| 2022/0392340 | A1* | 12/2022 | De Steuben | G08G 1/0141 |
| 2022/0414244 | A1* | 12/2022 | Atluri | G06F 16/176 |

* cited by examiner

250 ⟶

252 Display a metadata editing tool GUI on a user device.

254 Receive a user input that configures a first predetermined parameter for modifying inherent metadata associated with images.

202 Receive a request for the image.

•
•
•

210 Serve the image and the modified metadata.

262 Receive a plurality of requests for obtaining a first image.

264 Serve a first copy of the image to a client system.

266 While serving the first copy of the image, add a first unique identifier to generate first modified metadata associated with the first copy of the image.

FIG. 2E

METHODS AND SYSTEMS FOR DYNAMICALLY MODIFYING METADATA WHILE SERVING IMAGES

CROSS-REFERENCE TO RELATED APPLICATION

This application claims the benefit of priority to U.S. Provisional Application No. 63/255,345, filed Oct. 13, 2021, which is incorporated herein by reference in its entirety.

TECHNICAL FIELD

Several of the disclosed embodiments relate to image service systems and processes, and more particularly, to systems and processes for modifying metadata associated with images.

BACKGROUND

Image metadata is information written into a digital file associated with an image (e.g., a digital photograph). Image metadata may include information identifying ownership, time, and geographic location of capturing the image, descriptive information (e.g., pixel dimensions, brightness, contrast, orientation, etc.), or identifiers. Some metadata is created by the camera device used for capturing the image while some metadata is created by the user and/or software used for downloading, distributing, modifying, or publishing the image. In some instances, image metadata may be used for searching images on computers over the Internet. In some instances, a user may wish to modify image metadata to improve searchability, improve display properties of the image, or protect sensitive information included in the image metadata.

BRIEF DESCRIPTION OF THE DRAWINGS

FIG. 2D is a block diagram illustrating a method for receiving a user input that configures a predetermined parameter for modifying inherent metadata associated with served images.

FIG. 2E is a block diagram illustrating a method for serving copies of an image having metadata with unique identifiers to different client systems.

DETAILED DESCRIPTION

Figure 1A:
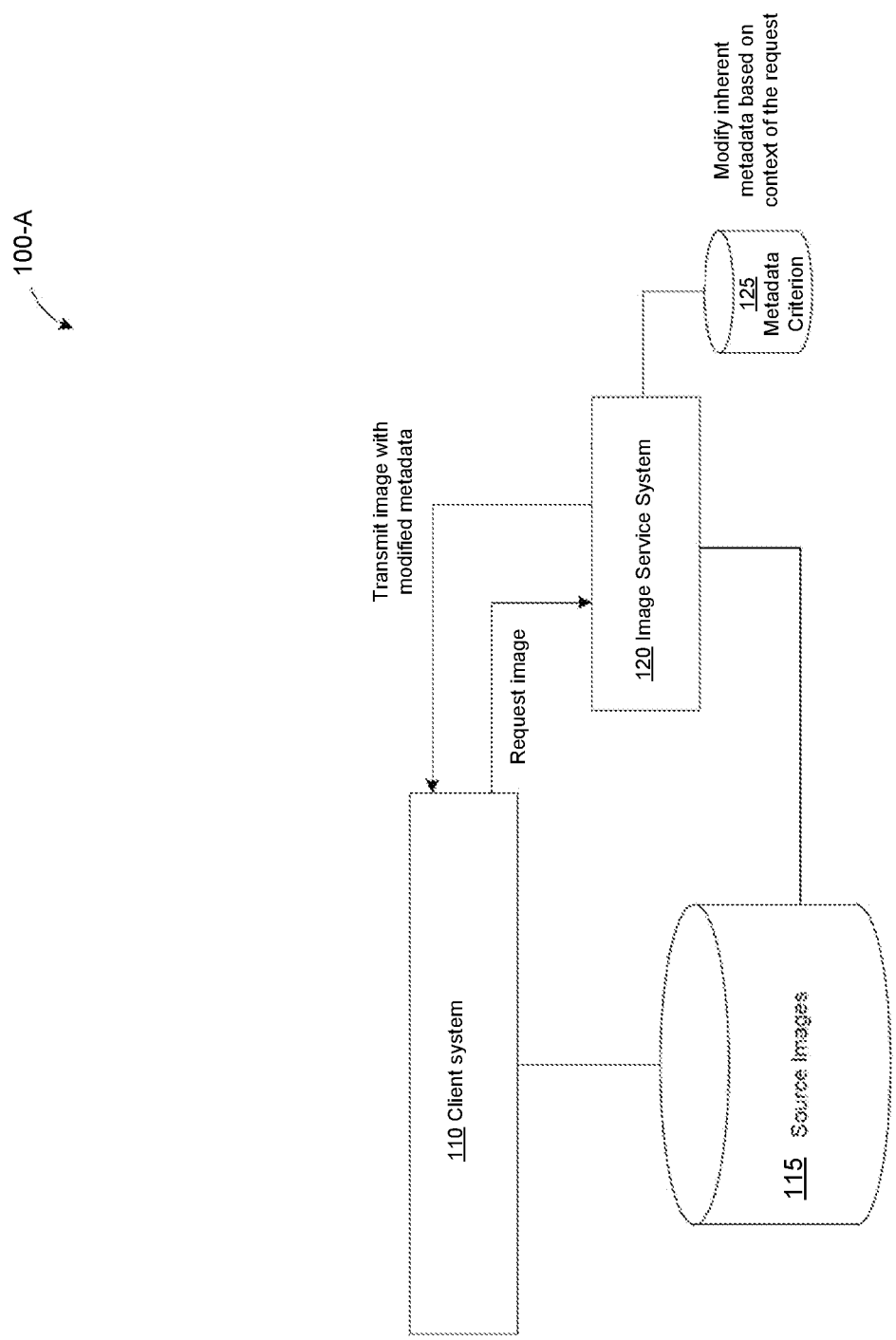
FIGS. 1A-1C are block diagrams illustrating systems for dynamically serving modified image metadata.

Disclosed herein are methods and systems for serving images as well as for dynamically modifying metadata associated with the served images. The modifications are dynamic in that they are performed at the time of image service and according to the circumstances/characteristics of the request. The modifications are performed on the copy of the image that is served to the requestor and not the original stored image.

Image metadata includes information related to properties of the image, such as pixel dimensions, color profile, brightness, or contrast. The metadata may also include information identifying the ownership of an image, time and geographic location of capturing the image, or identifiers specific to the image. On some occasions, a client system that can be either a web host or an end-user may wish to modify the metadata for various reasons.

For example, an end-user may wish to hide some sensitive or personal information (e.g., such as a location where a photo was captured) or to add a unique identifier to enable tracking of the image as it is transmitted on the Internet. A web host may wish to modify the metadata to optimize some features of the image for a better display of the image. For example, an advertisement website may wish to modify the pixel dimensions of an image on their website to optimize the display of the image on different mobile devices used for viewing the website. An image viewed on a mobile phone may be optimized to have a different size or brightness compared to the same image viewed on a laptop. Therefore, there is a need for providing different client systems tools for automatically and conveniently receiving images with modified metadata. Furthermore, modifying the metadata and serving the image should happen efficiently and simultaneously without delays to the end-user's experience of obtaining images.

Various embodiments of the disclosed systems and methods include an image service system for providing image metadata modification services for client systems who wish to modify metadata associated with images that they use (e.g., publish, share, view, etc.). The image service system receives a request to obtain an image from a client system. In response to the request, the image service system serves the image to the client system while modifying the metadata associated with the image. The data is modified in accordance with a predetermined criterion that is based on the context of the request.

The context may be associated with a type of the client device that is requesting the image (e.g., a mobile phone, a laptop computer, a tablet computer, or a desktop computer) or with a type of a website or web application (also known as "apps"). A website refers to a set of related web pages that contains images, text, audio, etc. For example, a website may be associated with a news or media provider (e.g., New York Times or NBC), an educational or commercial organization, a non-profit organization (e.g., Wikipedia), etc. A website may include static content (e.g. a user may review the content on a website but not modify the content). A web application, in contrast, is designed to allow a user to interact with the content on the web application. For example, a web application may be associated with a social media platform application (e.g., Instagram or Facebook), an online store application (e.g., Gap or Target), a map application (e.g., Google Maps or Apple Maps), etc. In some instances, websites include web application features.

The context may also be associated with other features of the request such as the date and time of the request or the geographic location of the device making the request. The disclosed systems and methods are capable of modifying the image metadata very fast so that a user would not observe delays in obtaining an image (e.g., a time for downloading an image from a cloud storage or a time for loading an image on a website). In some embodiments, such time for modifying image metadata is less than 15 ms, less than 25 ms, less than 50 ms, or less than 100 ms. The modified metadata can be served to the client within the same time frame as it takes for the image to be loaded on a website or downloaded on a device without causing any delay or inconvenience to a user.

Further embodiments of the disclosed systems and methods include an image service system for providing image metadata modification services for tracking images on the Internet. The image service system serves a plurality of copies of the same image to client systems and while serving the plurality of images, adds unique identifiers to the metadata associated with each of the plurality of images. The unique identifiers may be used for tracking and locating the copies of the images over time on the Internet.

For example, an advertisement website may wish to track how effectively different end-users or advertisers are capable of distributing an advertisement image online. By associating a unique identifier with an image served to and published by a respective end-user, and determining after a certain period of time, how many times the image published by the respective end-user has been loaded, the end-user's effectiveness in distributing the advertisement image to consumers can be estimated.

Figure 1B:
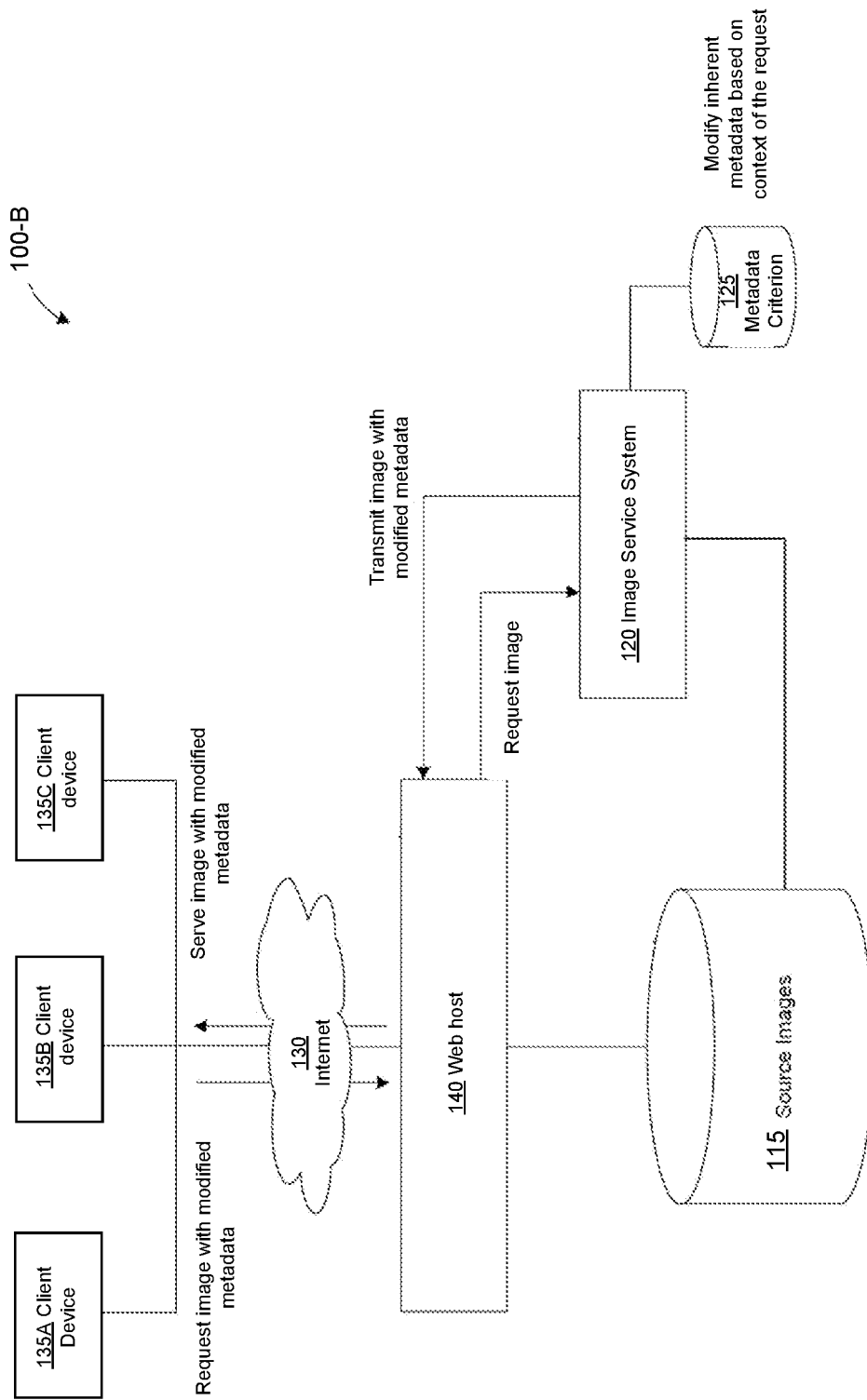

FIGS. 1A-1B are block diagrams illustrating systems for dynamically serving image metadata. FIG. 1A illustrates a system 100-A including a client system 110 corresponding to an end-user device and an image service system 120. Client system 110 and image service system 120 are configured by software applications that include instructions that, when executed by processors of the systems, cause the systems to carry out methods and operations. For example, client system 110 and image service system 120 include memory (e.g., memory 310 in FIG. 3) including instructions which, when executed by one or more processors (e.g., processors 305) cause the systems to perform operations described below with respect to FIGS. 2A-2F. An end-user device can be a smartphone, a laptop, a desktop, a tablet PC, or any other suitable device for viewing, storing, and/or publishing image content. Image can include text, video, audio, or any other multi-media content. The content on an end-user device can be published or viewed in many ways, including on websites and web applications. The content can be accessed by the end-users in a number of ways, e.g., via web browsers, or apps which when executed on an end-user device display the content. Image service system 120 is in wireless communication (e.g., via the internet) with client system 110.

Image service system 120 is configured to receive requests for obtaining images from client system 110 and return the images to client system 110. While serving the images, image service system 120 is configured to modify metadata associated with the respective images and serve the images to client system 110 together with the modified metadata. For example, image service system 120 receives a request from client system 110 for obtaining an image. The image is associated with inherent metadata. Image serving system 120 serves the image to the client system together with modified metadata associated with the image.

Image service system 120 enables client system 110 to obtain various processed images for a given single image. An advantage of the disclosed system is that image service system 120 does not need to store different versions of an image that are configured for display on various devices. Instead, image service system 120 only needs to store one version of an image and a set of configuration settings that can be applied to modify the metadata of the stored image, upon request. This reduces the administrating burden and resources required for serving various versions of the images to client system 110.

In some embodiments, image service system 120 obtains the requested image from client system 110. For example, the image is stored at client system 110 (e.g., in a memory of an end-user device). In some embodiments, image service system 120 obtains the source image from a location such as a source image storage system 115 specified by client system 110 or from a cache associated with image service system 120 (not illustrated). The source image storage system 115 can be any type of storage system including a database, file storage, and/or any other convenient or known storage technique. Further, the source image storage system 115 can be part of client system 110 or provided by a third party storage services, such as cloud storage from Dropbox, Amazon AWS, Microsoft Azure, Google etc., where client system 110 has stored the source images at. The source image storage system 115 provides the requested image data as well as inherent metadata associated with the image to image service system 120.

Image service system 120 processes inherent metadata associated with the source image based on a predetermined criterion that is at least partially based on a context of the request. The predetermined criterion includes a set of instructions to be executed on the inherent metadata associated with the image to generate modified metadata. The criterion can include instructions to change, remove, and/or add one or more parameters to the inherent metadata. In some embodiments, the predetermined criterion includes instructions for modifying information associated with the location where the image was capture, the time when the image was captured, pixel dimensions of the image, the orientation of the image, color profile, parameters associated with display of the image (e.g., contrast and brightness). In some embodiments, the predetermined criterion includes instructions for adding information to the inherent metadata (e.g., a unique identifier).

In some embodiments, the predetermined criterion is provided by client system 110. For example, client system 110 may display a user interface for receiving user input to determine a criterion associated with a particular context of a request to obtain an image. As another example, client system 110 may determine the criterion based on a user account of a user associated with client system 110. In some embodiments, the predetermined criterion is stored in a storage system associated with image service system 120 such as a metadata criterion store 125. In some embodiments, the criterion store 125 can be implemented as various storage systems including a database, a file system and/or any other convenient or known storage techniques.

FIG. 1B illustrates a system 100-B including a web host 140 (e.g., a web hosting service provider). For example, a web host service provider provides the technologies and services (e.g., processors and a memory) needed for websites or web applications to be viewed via the Internet 130. Websites and/or web applications are hosted, or stored, on special servers and are accessed through the Internet 130. In system 100-B, web host 140 is in communication with a plurality of client systems corresponding to end-user devices (e.g., client devices 135A, 135B, and 135C). In system 100-B, web host 140 receives requests for obtaining images from client devices 135A, 135B, and 135C and web host 140 transmits the request for the image on behalf of the client devices to image service system 120. Subsequently, web host 140 transmits the served image with the modified metadata from image service system 120 to the respective client device. In some embodiments, web host 140 obtains the source image from a location such as a source image storage system 115 specified by the client device and transmits the image to image service system 120.

Figure 1C:
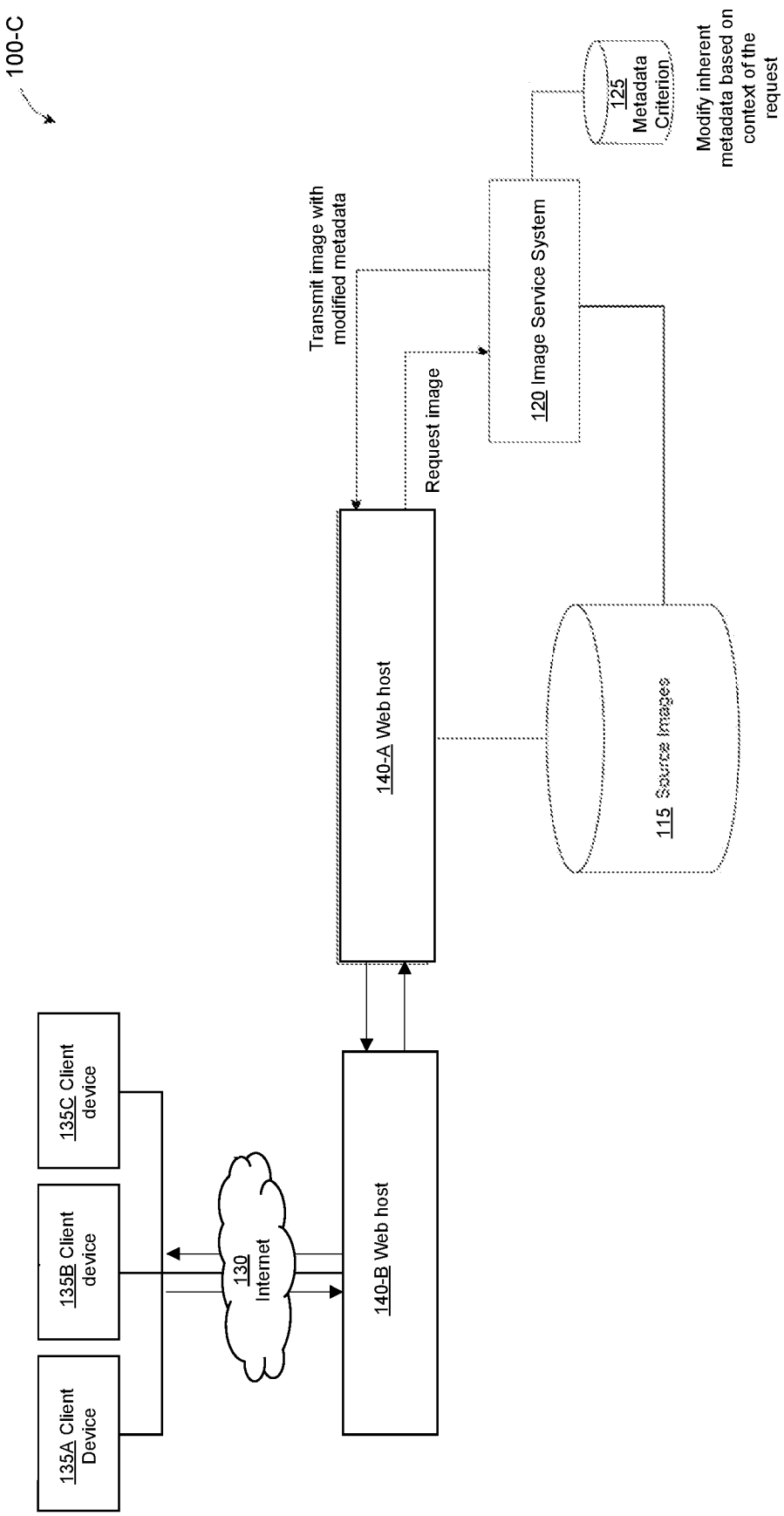

FIG. 1C illustrates a system 100-C including a web host 140-A and a web host 140-B in communication with each other (e.g., via the Internet). In system 100-C, web host 140-B is in communication with client devices 135A, 135B, and 135C. In system 100-C, web host 140-B receives requests for obtaining images from client devices 135A, 135B, and 135C and web host 140-B transmits the requests for obtaining the images on behalf of the client devices to the web host 140-A which then transmits the requests to image service system 120.

Subsequently, web host 140-A transmits the served images with associated modified metadata from image service system 120 to web host 140-B which further transmits the images to the respective client devices. In some embodiments, web host 140-B obtains a source image from a location such as a source image storage system 115 specified by the client device and transmits the image to image service system 120. System 100-C may be implemented in an incidence where a client device has accessed a web link on a website or web application hosted by web host 140-B and the link provides an access to a website or web application hosted by web host 140-B.

Figure 2A:
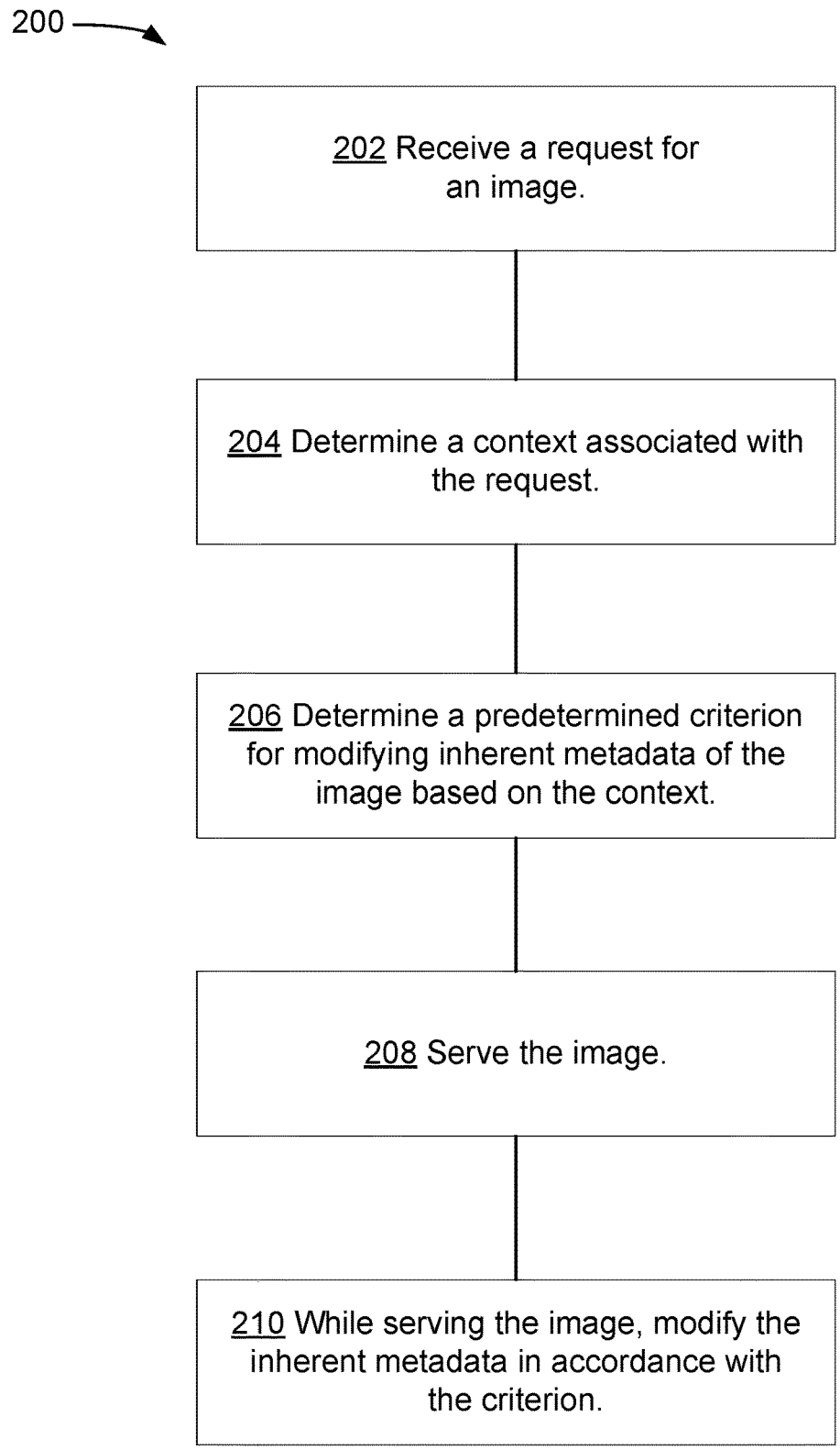
FIG. 2A is a block diagram illustrating a method for dynamically serving modified image metadata.

FIG. 2A is a block diagram illustrating a method 200 for dynamically serving modified image metadata. In some embodiments, method 200 may be performed by any of the systems described above with respect to FIGS. 1A-1C.

Method 200 includes receiving (202), at an image service system (e.g., image service system 120) from a client system (e.g., client system 110), a first request for obtaining an image. In some embodiments, the request for obtaining an image corresponds to a request for loading an image on a website. For example, a user opens a website that includes images. In some embodiments, the website is a web browser, a social media website, a commercial website, a news streaming website, etc. For example, a user is loading a web page that includes one or more images. In some embodiments, the request for obtaining an image corresponds to a request to download an image from a website. In some embodiments, the request for obtaining an image corresponds to a request to download an image from an application (e.g., a social media application, a commercial application, or an entertainment application). In some embodiments, the request for obtaining an image corresponds to a request to download an image from an image storage system (e.g., source image storage 115. For example, a user has an account for an image service storage (e.g., Google Photos) and requests to download an image stored in the storage to his or her device.

The requested image is associated with inherent metadata. The inherent metadata is a set of data including information regarding ownership, administration, and/or properties of the image. In some embodiments, the inherent metadata includes information related to the creation of the image (e.g., capturing a photo). In some embodiments, the inherent metadata includes information related to the geographical location of capturing an image, date and time of capturing the photo, identification of a device used for capturing the image, camera settings of the device at the time of capturing the image, etc. In some embodiments, the inherent metadata includes information associated with downloading, uploading, transferring, or saving the image (e.g., information identifying a time and a device used for uploading an image to a storage database). In some embodiments, the inherent metadata includes pixel dimensions of the image. In some embodiments, the inherent metadata includes information about the resolution of the image. In some embodiments, the inherent metadata includes information about the orientation of the image. In some embodiments, the inherent metadata includes information associated with image properties (e.g., contrast, brightness, color profile or gamut, color temperature, etc.).

In some embodiments, method 200 further includes determining (204), by the image service system, a context associated with the first request of the image. In some embodiments, said determining the context includes identification of a type of the client system. In some embodiments, the type of the client system (e.g., client system 110 or 140 in FIGS. 1A-1B) is selected from a desktop computer, a laptop computer, a tablet computer, a mobile phone, and a web application server system. In some embodiments, the context further includes a make and model of the client system. For example, the type of the client system is selected from mobile phones having different manufacturers (e.g., Apple, Samsung, Huawei, LG, etc.) or models (e.g., iPhone 13 mini or iPhone 13 Pro Max). Different client device types as well as devices of a particular type but with different manufacturers or models have different display properties such as different display sizes. For example, iPhone 13 mini has a smaller display than iPhone 13 Pro Max).

In some embodiments, the context of the request is determined based on the type of the mobile device so that the metadata of the requested image can be modified to improve display of the image on the client device associated with the request. In some embodiments, improving display of the image based on the specifications of the client system making the request includes changing the pixel size of the image. As used herein, improving display of the image includes adjusting the metadata associated with the image to optimize the appearance of the image displayed on a particular device. For example, an image displayed on a laptop has different pixel dimensions than when the same image is displayed on a mobile phone. As another example, an image displayed on a mobile phone of a first type has a different color profile than when the image is displayed on a mobile phone of a second type different from the first type. In some embodiments, said determining the context includes determining an application or a website associated with the client system that was used for requesting obtaining the image. For example, the application or website is a web browser application, a social media application, a commercial application, or a news provider application.

In some embodiments, method 200 includes determining (206) a predetermined criterion for modifying inherent metadata of the image based on the context. In some embodiments, the criterion is predetermined by a user associated with the client system. In some embodiments, the predetermined criterion is defined based on a user input received by the client system. For example, a user associated with a client system (e.g., client system 110) provides an input determining the predetermined criterion. The user associates a certain criterion with a certain context. In some embodiments, the predetermined criterion is based on a context associated with the first request of the image. In some embodiments, a user associates a particular predetermined criterion with a request received from a particular type of client device. For example, a user can provide a criterion that defines what metadata is included when another user requests to load a photo on the user's social media platform user account. The user may, for example, want to exclude any personal information (e.g., where the photo was taken) from the metadata when the photo is being viewed by someone who is not identified as a "friend" on the user's user account. In contrast, the user may want to include the personal information in the metadata when the photo is being viewed by someone who is identified as a friend.

In some embodiments, the type of the client system is included in the predetermined criterion. For example, the criterion may include removing geographic location information from the metadata when the request for the image is received from a mobile phone. As another example, the pixel dimensions of the image are modified to correspond to particular pixel dimensions when the request for the image is received from a laptop computer. In some embodiments, the criterion may include adding a unique identifier to the metadata when the request for the image is associated with a website or an application. For example, a user may wish to add a unique identifier to an image uploaded to the internet. Such a unique identifier may be used for tracking the image for the prevention of copyright violations. In some embodiments, said modifying the inherent metadata includes improving display of the image on the type of the client system based on system specifications of that type.

In some embodiments, the predetermined criterion is determined based on a user account associated with image storage (e.g., source image storage 115), a website or web application (e.g., the user's social media account, or the user's account associated with a particular application). In some embodiments, the predetermined criterion is stored in a database of, or accessible by, the image service system (e.g., metadata criterion storage 125 in communication with image service system 120 in FIG. 1A).

In some embodiments, method 200 includes receiving, at the image service system from the client system, a request for modifying the predetermined criterion. For example, the client system requests the image service system to store a predetermined criterion associated with the client system or requests the image service system to update an existing predetermined criterion.

Method 200 includes serving (208), by the image service system, the image to the client system in response to the first request for obtaining the image. In some embodiments, serving the image includes retrieving, by the image service system, the image identified by the client system from the image storage and transferring the image to the client system, as described above with respect to FIGS. 1A-1C. In some embodiments, serving the image includes retrieving the image from the client system and transferring the image back to the client system.

The method further 200 includes, while serving the image to the client system, modifying (210), by the image service system, the inherent metadata associated with the image that is served to the client system in accordance with the predetermined criterion. In some embodiments, the predetermined criterion is based on data included within the original request (e.g., in step 204). The inherent metadata of the image stored by the image service system is not modified. Image service system 120 modifies the inherent metadata so fast (e.g., <15 ms) that the modifications can be done while serving the image without the user noticing any delays when obtaining the image. The pace of the modification is fast at least because the context can be derived from the original request to serve the image and thus further back and forth communication between the requestor and the image host is not required.

The dynamic modification of the metadata enables the disclosed system to store only a single version of the image instead of storing different versions of the image optimized for different request contexts. This reduces the administrating burden and resources required for serving various versions of the images to client system 110.

In some embodiments, modifying, by the image service system, the inherent metadata associated with the image includes removing or changing information associated with a location where the image was captured. For example, a user may wish to remove any information revealing personal information (e.g., a home location) or information about travel locations. In some embodiments, modifying, by the image service system, the inherent metadata includes changing the pixel dimensions of the image. In some embodiments, modifying the inherent metadata includes changing an orientation of the image. In some embodiments, modifying the inherent metadata includes changing a color profile of the image. In some embodiments, modifying the inherent metadata associated with the image includes changing one or more dimensions of the image or one or more parameters (e.g., contrast, brightness, color temperature, etc.) associated with the appearance of the image. For example, the inherent metadata is modified to improve display of the image on the particular user device that requested the image. In some embodiments, modifying the inherent metadata associated with the image includes adding information to the metadata (e.g., adding a unique identifier for tracking the image on the internet by web crawler programs).

In some embodiments, method 200 includes receiving, at the image service system from the client system, a second request for obtaining the image. The second request is received subsequent to the first request. For example, the first request corresponds to loading an image on a website for a first time and the second request corresponds to re-loading the same image on the website. Method 200 includes re-serving, by the image service system, the image to the client system in response to the second request for obtaining the (same) image. While re-serving (e.g., serving for a second time subsequent to serving an image for a first time) the image to the client system, method 200 includes modifying, by the image service system, the inherent metadata of the image in accordance with the predetermined criterion so that the modified metadata associated with the re-served image is different than the modified metadata associated with the served image. In some embodiments, the second request for obtaining the image corresponds to a request to reload the image, and re-serving the image corresponds to reloading the image on the client device.

Figure 2B:
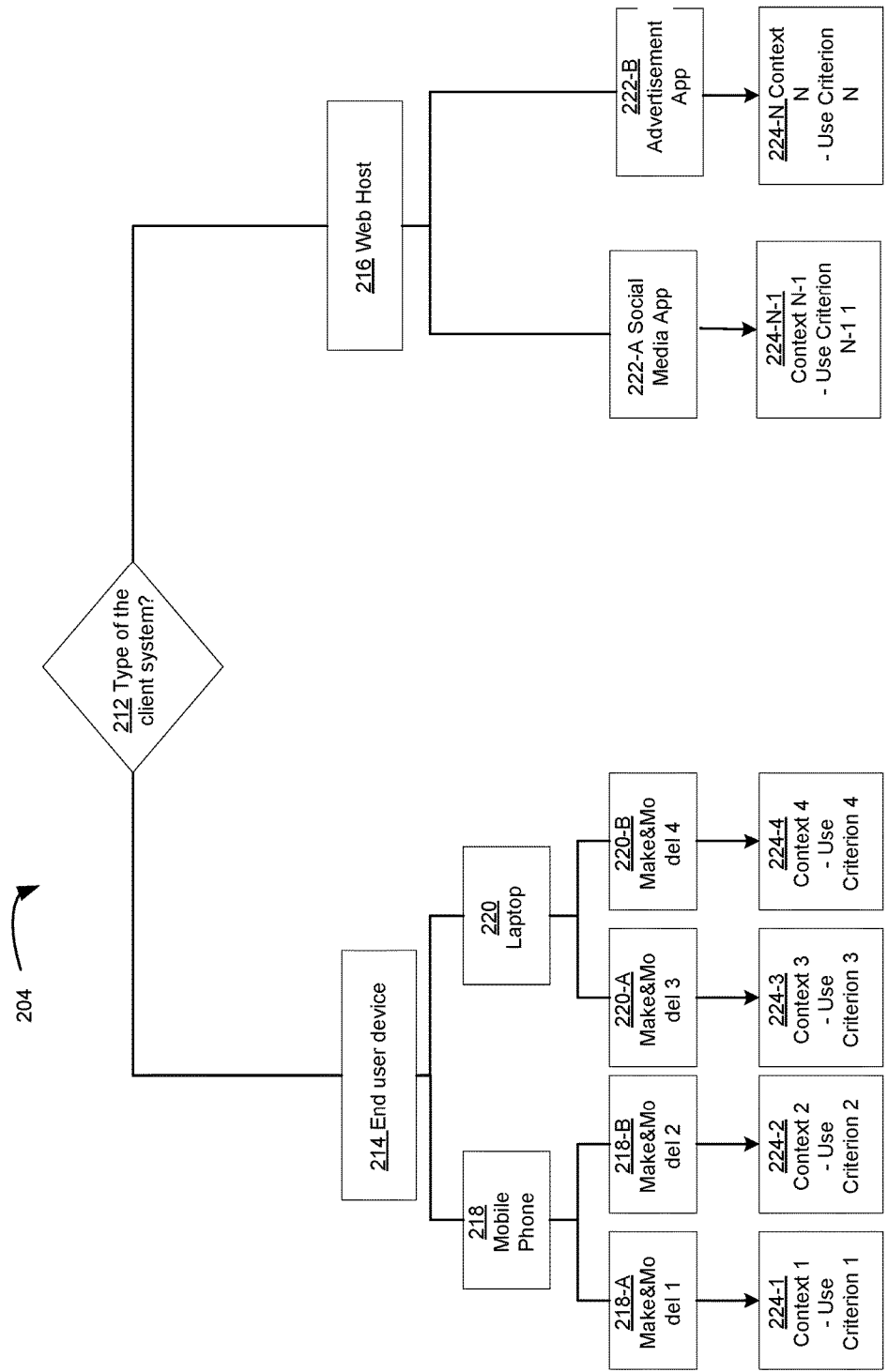
FIG. 2B is a block diagram illustrating a method for determining contexts associated with a request for obtaining an image.

FIG. 2B is a block diagram illustrating a method 204 of determining contexts associated with a request for obtaining an image. In some embodiments, method 204 initiates by a determination of a type of a client system (212). In a first instance, in accordance with the determination, the client system is an end-user device (214). For example, client system 110 is a desktop computer, laptop computer, tablet computer, or a mobile phone. In some embodiments, method 204 further includes determining a type of the client system. In FIG. 2B, the exemplary instances include an instance where the type of the client system is a mobile phone (218) or a laptop (220).

In some embodiments, method 208 further includes determining a make (e.g., a manufacturer) and model of the particular client system types. The mobile phone 218 is determined to be, e.g., of a first make and model (218-A) or of a second make and model (218-B). In some embodiments, device types 218-A and 218-B are from the same manufacturer but are of a different model. In some embodiments, device types 218-A and 218-B are from different manufacturers. Similarly, laptop 220 is determined to be, e.g., of a third make and model (220-A) or a fourth make and model (220-B). Here, the selection of the make and model is illustrated as a selection between two different makes and models. However, the make and model could be selected from three, four, five, ten, etc., makes and models. Each of the user device types, further distinguished by their second make and model 218-A, 218-B, 220-A, and 220-B, is recognized as a unique context.

As shown, a mobile phone of make and model 218-A is recognized as first context (224-1), a mobile phone of make and model 218-B is recognized as second context (224-2), a laptop of make and model 220-A is recognized as third context (224-3), and a laptop of make and model 220-A is recognized as context 4 (e.g., 224-4). Furthermore, as described above, in some embodiments, the predetermined criterion includes the type of the user device associated with the request to obtain the image.

In some embodiments, the predetermined criterion identifies one or more parameters of the inherent metadata to be modified upon serving the image based on the context of the request. Consequently, for a request associated with the mobile phone recognized as first context first criterion should be applied, for a request associated with the mobile phone recognized as second context second criterion should be applied, for a request associated with the laptop recognized as third context third criterion should be applied, and for a request associated with the laptop recognized as context 4 criterion 4 should be applied.

Similarly, in a second instance, in accordance with the determination of the client system type, the client system is web host 216 client system. For example, web host 216 provides technologies and services (e.g., processors and memory) for a variety of websites and/or web applications (e.g., websites and web applications associated with social media, advertisement, commercial, news, etc.). In some embodiments, method 204 further includes determining a type of a web application that is associated with the request for obtaining the image. In FIG. 2B, exemplary instances include an instance where the request was through a social media application 222-A or an advertisement application 222-B.

Each of the application types is recognized as a unique context. As shown in FIG. 2B, social media app 222-A is recognized as $(N-1)^{th}$ context and advertisement application 222-B is recognized as $N^{th}$ context. In some embodiments, the predetermined criterion includes the type of application associated with the request to obtain the image. As described above, the predetermined criterion identifies one or more parameters of the inherent metadata to be modified upon serving the image based on the context of the request. Consequently, for a request associated with the social media application recognized as $(N-1)^{th}$ context the $(N-1)^{th}$ criterion should be applied, and for a request associated with the advertisement application recognized as $N^{th}$ context the $N^{th}$ criterion should be applied.

In some embodiments, two or more criteria are applied to the same request for an image. For example, for a request made via a social media application 222-A on a client system identified as first make and model 218-A first criterion as well as $(N-1)^{th}$ criterion would be applied as the request is associated with first context as well as $(N-1)^{th}$ context. In some embodiments, the different criteria are determined at the same time in response to receiving a request for an image. In some embodiments, a first criterion is determined at a first time an image is requested and a second criterion is determined at a second time the same image is requested. Such an embodiment is described in detail with respect to FIG. 2C.

In some embodiments, in addition to determining the type of the client system, the image service system may determine other parameters or conditions associated with the request for obtaining an image. In some embodiments, the image service system determines the context of the request based on a time and date of the request. In some embodiments, the image service system determines the context of the request based on a geographic location of the device associated with the request to obtain the image. In some embodiments, the image service system determines the context of the request based on the user's user account on particular a website, a web application, or an image storage server (e.g., source image storage 115). In some embodiments, the image service system determines the context of the request based on settings associated with the client device that requested to obtain the image. For example, the settings may include display brightness, contrast, or orientation settings. The settings may define whether the client device is on a battery saving mode (e.g., the brightness of the display is reduced). In some embodiments, the request to obtain the image includes information required for the image service system to determine the context of the request. The request may, for example, include information about the client device or display settings on the client device.

Figure 2C:
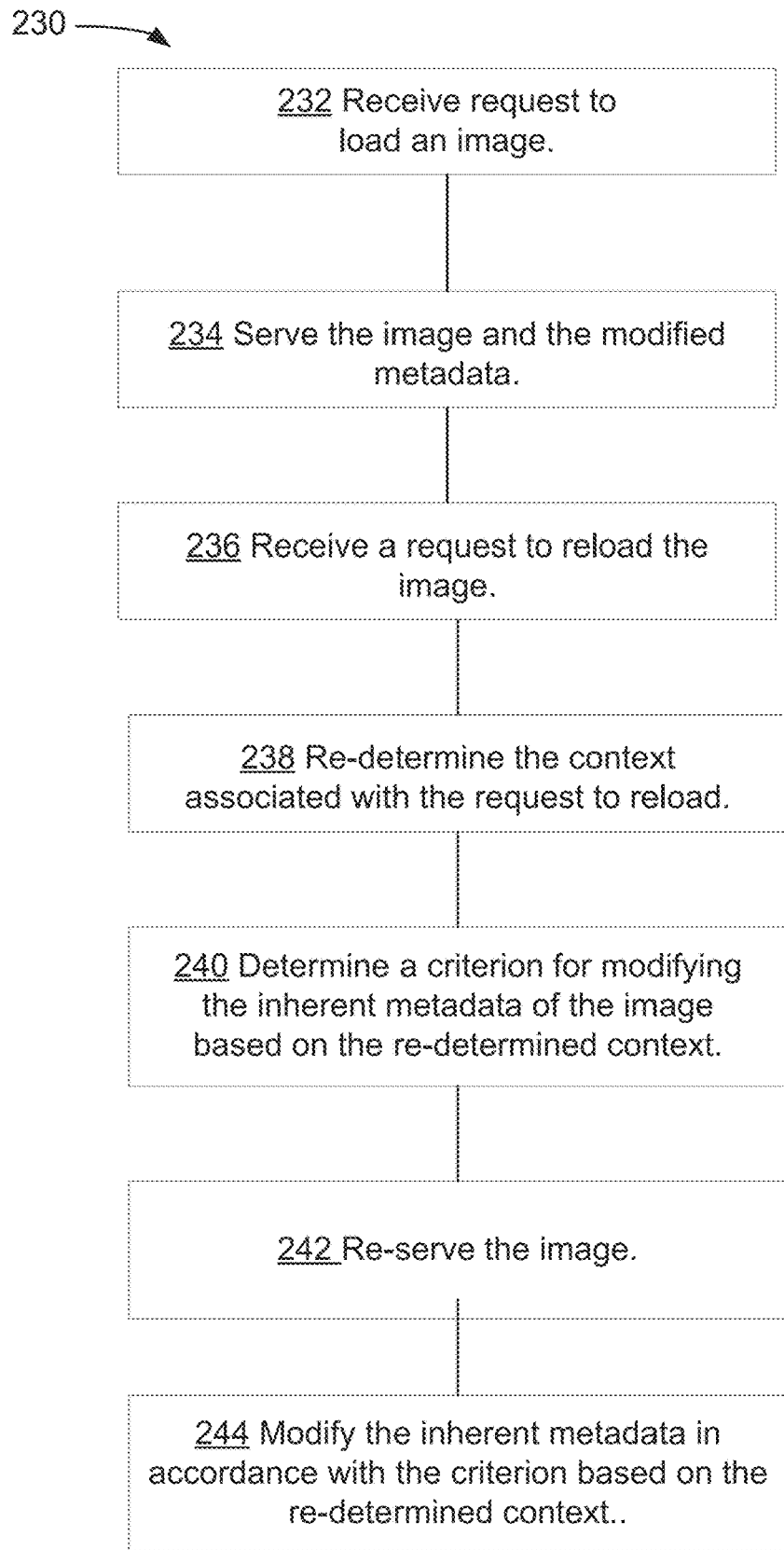
FIG. 2C is a block diagram illustrating a method for dynamically serving modified image metadata in response to a request to load and reload an image on a website.

FIG. 2C is a block diagram illustrating a method 230 for dynamically serving modified image metadata in response to a request to load and reload an image on a website. In FIG. 2C, method 230 includes receiving (232), by the image serving system (e.g., image serving system 120), a request to load an image on a client device. In some embodiments, the request is from a client device (e.g., client device 135A in FIG. 1B) and is transmitted from the client system to the image service system by a web host (e.g., web host 140 in FIG. 1B). For example, a user associated with client device 135A is opening a web page that includes an image corresponding to a request to obtain the image. In response to the request, method 230 includes performing the steps described above with respect to method 200 (e.g., steps 204, 206, 208, and 210) and then serving (234) the image and the associated modified metadata to the client system. It is noted that modifying the image while serving the image is performed within such a short time that the user does not experience any delays while loading the image.

Subsequent to loading the image, method 230 includes receiving (236), by the image serving system (e.g., image serving system 120), a request to re-load the same image on the client device. For example, the user is refreshing the webpage including the image. In response to the request to reload the image, the image service system re-determines (238) the context associated with the request to reload and determines (240) a criterion for modifying the inherent metadata of the image based on the re-determined context.

In some embodiments, the request to reload the image includes different or more information than the original request to load. For example, the request to load an image includes the make and model of the client device and the request to reload the same image includes information of the user account associated with the request to reload the image (e.g., social media platform user account. In some embodiments. As another example, the request to load an image includes the make and model of the client device and the request to reload the same image includes information of display settings associated with the client device (e.g., a brightness setting).

By splitting the metadata modifications to be done in response to multiple load/reload requests so that less modifications are done at a time shortens the time required for serving images with modified metadata. This subsequently improves the user experience by shortening the time required for loading/reloading images.

Method 230 further includes re-serving (242) the image and the modified metadata based on the re-determined context. As used herein, re-serving the image corresponds to serving an image to the same client device (e.g., client device 135A) via the same web host (e.g., web host 140) for the second time subsequent to serving the image for the first time. Method 230 further includes, while re-serving the image, modifying (244) the inherent metadata in accordance with the criterion.

In some embodiments, re-determining (238) the context (e.g., updating the determined context) associated with the request to reload the image is performed in a similar manner as described with respect to determining the context (204) in FIGS. 1A-1B. In some embodiments, however, the re-determination (238) done in response to the request to reload the image differs from the determination (204) done in response to the first request for loading the image even though the requests are made with the same client device and same website or web application. In some embodiments, in response to the request to load the image for the first time, the image service system determines a first context of the request based on a first condition, and in response to the request to re-load the image, the image service system determines a second context of the request based on a second condition. In some embodiments, the first condition corresponds to a first type of client system (e.g., web host 216 in FIG. 1B) and the second condition corresponds to a second type of client system (e.g., end-user device 214 in FIG. 1B).

For example, in response to the request to load the image for the first time, the image service system determines the context associated with the request by determining what type of web application or website was used for receiving the request. In an instance that the image service system determines that the request for loading the image was done via an advertisement application (222-B), the image service system modifies the inherent metadata associated with the image using $N^{th}$ criterion and serves the image and the modified image data to the client system. In response to the request to re-load the image, the image service system re-determines the context associated with the client device associated with the request. In an instance that the image service system determines that the request for re-loading the image (e.g., requesting the image for the second time) was done on a mobile phone having first make and model (218-A), the image service system re-serves the image and the re-modified image data to the client system. Furthermore, the client may further request to load the image for the third time, and the image service system would determine a third condition associated with the request (e.g., looking at time and place for the request, geographic location of the device associated with the request, user account associated with the request, etc.) and serve the image to the client system with the inherent metadata associated with the third condition.

In some embodiments, method 230 improves the efficiency of loading images on a website or on a web application by modifying the metadata step by step. In method 200 described with respect to FIG. 2A, the client system may request an image once and the image service system serves the image together with the modified metadata once. Such an incident may correspond to, for example, a situation where a user of the client system 110 is downloading an image stored to the image storage system 115 onto client system 110 (e.g., mobile device). The request made by the client system includes at the time of the request all relevant information associated with the context of the request and the metadata may be modified accordingly while serving the image. However, in some instances, e.g., when a user is loading and reloading an image on a website, the request to load the image does not include all relevant information associated with the context of the request because it may take too long to process the request and/or modify the metadata. Thereby, method 230 improves the efficiency of serving images with the modified metadata upon the request to load/reload an image by modifying the metadata step by step.

For example, as described above, the metadata is first modified with respect to information related to a user account associated with the request to load an image, and the metadata is subsequently modified with respect to information related to a make and model of the client system associated with the request to reload the image. As another example, method 230 may be applied in an instance where the metadata associated with an image is modified based on an application user account context. For example, a first user is requesting to load an image on a second user's account on a social media platform. In response to the request to load the image, the image service system modifies metadata associated with the image based on a first criterion. The metadata, for example, excludes some sensitive or personal information (e.g., geographic location of where a photo was captured). The metadata modified based on the first criterion is available for anyone having an access to review images on the second user's user account (e.g., corresponding to a first application user account context). However, in response to a request to reload the image, the image service system modifies metadata associated with the image based on a second criterion. The metadata modified based on the second criterion is available for only those user's that the second user has identified as "friends." The metadata served upon the request to reload includes, for example, the sensitive or personal information excluded in the earlier served metadata.

In some embodiments, the predetermined criterion for modifying images based on the context of the request is received as an input from a user. As described above with respect to FIGS. 2A-2B, the criterion may include one or more parameters for modifying certain information of the metadata. FIG. 2D is a flowchart illustrating a method 250 for receiving a user input that configures a predetermined parameter for modifying inherent metadata associated with images and serving images modified in accordance with the predetermined parameter.

Method 250 includes displaying (252) a metadata editing tool graphical user interface (GUI) on a user device (e.g., a user device corresponding to client system 110 or client devices 135A, 135B, or 135C described with respect to FIGS. 1A-1C). The metadata editing tool GUI is associated with an image service system (e.g., image service system 120). The GUI is configured for providing a predetermined parameter for modifying inherent metadata associated with images to be served by the image service system to the client system. In some embodiments, the GUI includes selectable affordances that allow a user to select which parameters of the metadata should be included or excluded when a certain criterion of the request context is satisfied. For example, the user may choose to reduce the pixel dimensions of an image when the image is requested by a mobile phone. In some embodiments, the GUI is included in a website or web application associated with a source image storage system (e.g., source image storage 115). For example, the GUI is part of a GUI of a web application or website that allows a user to access his or her photos stored in the source image storage system. As another example, the GUI is part of a website or an application that a user uses to publish his or her images.

In some embodiments, the GUI associated with the image service system provides a user a way to determine one or more parameters that device how to modify inherent metadata associated with the images that are transmitted from the metadata service system to the client device. In particular, the one or more parameters define a modification that should be done on the inherent metadata of an image when the image is requested by the client system under a particular context. For example, in relation to FIG. 2B, the GUI allows a user to define that when a request to obtain an image is made on a mobile phone having first make and model (218-A), first criterion including one or more parameters determined by the user should be used for modifying the inherent metadata. In some embodiments, the GUI includes one or more affordances allowing selection and/or determination of the parameters.

In some embodiments, the GUI is for providing one or more predetermined parameters for modifying the inherent metadata. In some embodiments, the one or more predetermined parameters correspond to the predetermined criterion for modifying the inherent metadata associated with an image served by the image service system, as described above with respect to FIGS. 2A-2B. The predetermined parameter is based on a respective context of a request for obtaining an image (e.g., the context corresponding to the context described with respect to method 203 in FIG. 2B). Method 250 further includes receiving (254), by the image service system via the image metadata editing tool of the client system, a user input that configures a first predetermined parameter for modifying inherent metadata associated with images to be served in response to a request having a first context. The first predetermined parameters may be associated with instructions to add, remove, or modify information included in the inherent metadata (see, e.g., steps 206 and 210 of method 200).

Method 250 further includes steps 202-210 of method 200 described above. In particular, method 250 includes receiving (202), by the image service system, a first request for obtaining a first image. The first image is associated with first inherent metadata and the first request is associated with the first context. Method 250 includes serving (210), by the image service system, the first image to the client system in response to the first request for obtaining the first image. While serving the first image to the client system, method 250 includes modifying (210), by the image service system, the first inherent metadata associated with the first image that is served to the client system in accordance with the first predetermined parameter. The first inherent metadata of the first image stored by the image service system is not modified.

FIG. 2E is a block diagram illustrating a method 260 for serving copies of an image having metadata with unique identifiers to different client systems. In some embodiments, method 260 may be performed by any of the systems described above with respect to FIGS. 1A-1C. Method 260 includes receiving (262), at an image service system (e.g., image service system 120) from a plurality of client systems (e.g., client devices 135A, 135B, and 135C in FIG. 1B), a plurality of requests for obtaining a first image. The request may be received simultaneously or at different times. For example, the image service system receives a request for obtaining the same image from two or more of the client devices 135A, 135B, and 153C.

In some embodiments, method 260 includes receiving, at a web host server system (e.g., web host 140 in FIG. 2B) from the plurality of client systems (e.g., client devices 135A, 135B, and 135C), the plurality of requests for obtaining the first image. In some embodiments, the request to obtain the image corresponds to a request to publish the first image (e.g., on a website or a web application). In response to a respective request of the plurality of requests for publishing the first image, method 260 includes requesting, by the web host server system from an image service system, a respective copy of the first image and transmitting, by the web host server, to each of the respective client systems of the plurality of client systems, the respective copies of the first image received from the image service system. The respective copies of the first image include modified metadata. The modified metadata includes a respective unique identifier for each of the respective client systems. For example, the plurality of requests for obtaining the first image is associated with a website or a web application that is served by a web host system (e.g., client devices 135A, 135B, and 135C are requesting the first image through a website or a web application that is associated with web host 140).

In some embodiments, web host 140 is associated with a website or a web application that different users are accessing through the client devices. In some embodiments, the website or the web application is an advertisement provider and the different users associated with the client devices are publishers that assist the advertisement provider in publishing and distributing advertisements on the internet. In some embodiments, the plurality of requests for obtaining the first image includes a request for publishing a copy of the first image on the internet. In some embodiments, the request for publishing the copy of the first image on the internet corresponds to a request, by a user of a social media platform, to publish the copy of the first image on the user's user account on the social media platform. For example, the end-users are bloggers or social media influencers that publish and distribute advertisements on their website or web application accounts. The users request to publish the first image which corresponds to an advertisement so that they can publish the image on their website or web application accounts.

As described with respect to method 200, the first image is associated with inherent metadata. Method 260 further includes serving (264), by the image service system, a first copy of the first image to a respective client system of the plurality of client systems in response to a respective request of the plurality of requests for obtaining the first image received from the respective client system. Serving a copy of the requested image is performed as described above with respect to step (208) method 200, with the exception that the image service system serves the different client devices copies of the first image instead of serving the original image that stays stored at the image service system. While serving the first copy of the first image to the respective client system of the plurality of client systems, method 260 includes modifying (266), by the image service system, inherent metadata associated with the first copy of the first image. In some embodiments, modifying the inherent is done as described with respect to step (210) of method 200. For example, the metadata is modified by the image service system based on a predetermined criterion (e.g., described with respect to FIG. 2B). Furthermore, in method 260, modifying the metadata further includes adding a first unique identifier to generate first modified metadata associated with the first copy of the image. The inherent metadata of the first image stored by the image service system is not modified. In some embodiments, the unique identifier is a set of numbers, letters and/or characters that allows the first copy of the first image to be searchable on the Internet.

In some embodiments, method 260 further includes serving, by the image service system, a second copy of the first image to another client system of the plurality of client systems different from the respective client system. The second copy of the first image is served in response to a respective request of the plurality of requests for obtaining the first image received from the another client system. For example, the first copy of the first image is served to client device 135A in response to a request received from client device 135A, and a second copy of the first image is served to device 135B in response to a request received from client device 135B. Client devices 135A and 135B are different client devices and, in some embodiments, associated with different end-users (e.g., different bloggers or social media influencers). While serving the second copy of the first image to the another client system of the plurality of client systems, method 260 includes modifying, by the image service system, inherent metadata associated with the second copy of the first image to include a second unique identifier another from the first unique identifier to generate second modified metadata associated with the second copy of the first image.

For example, the first copy received by client device 135A has a first unique identifier, and the second copy received by client device 135B has a second unique identifier. In some embodiments, the first unique identifier and the second unique identifier are configured for indexing (e.g., tracking) the first copy of the first image and the second copy of the first image on the internet by web crawler programs. In some embodiments, subsequent to serving the first copy of the first image, method 260 includes indexing of the first copy of the first image on the internet over a period of time by, e.g., web crawling programs. A web crawler program refers to a software program (e.g., a web bot) that automatically and systematically searches web pages for certain searchable strings (e.g., identifiers). Web crawler programs may track the different copies of the first image based on the unique identifiers. For example, the tracking may include identifying addresses of websites or web applications that have been used for loading a copy of the first image.

In some embodiments, the first unique identifier is included in metadata of all copies made of the first copy of the first image while the first copy of the first image is being copied on the internet. For example, when device 135A publishes the first copy of the image on a website or a web application, other end-users may view (e.g., load) the first copy of the image on their devices. The other end-users may further publish or share the first copy of the image thereby generating copies of the first copy of the first image. By using the first unique identifier, all copies of the first copy of the first image can be indexed over the internet. In some embodiments, method 260 further includes determining a number of copies made of the first copy of the first image over a period of time. In some embodiments, such determination is done by web crawling programs. Such indexing allows the advertisement website to collect data and analyze the success of an advertisement campaign. For example, the indexing allows the advertisement website to compare how effectively different users were able to distribute copies of the first image over the internet.

Figure 2F:
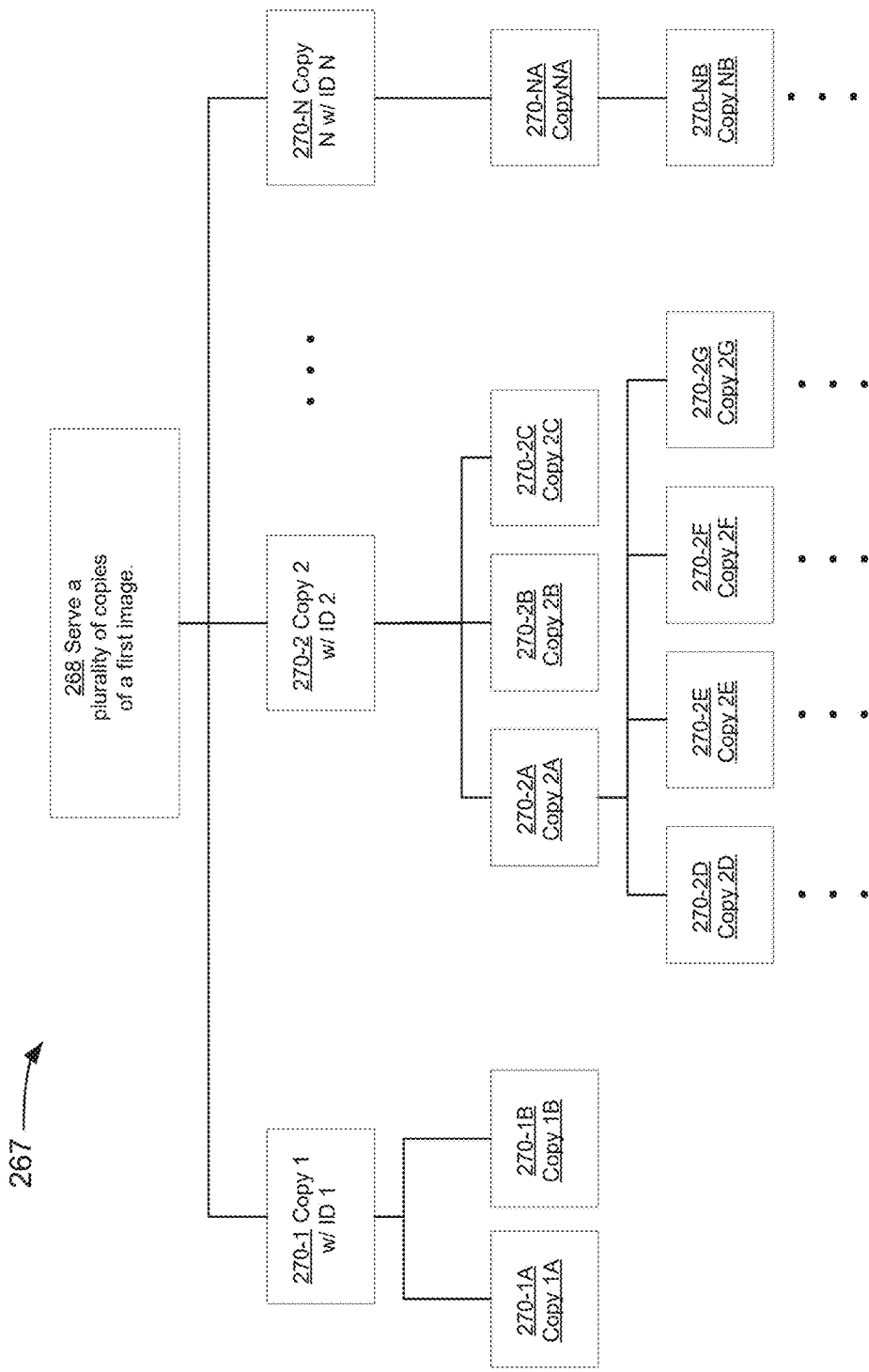
FIG. 2F is a block diagram illustrating a method tracking copies of a served image based on unique identifiers included in the metadata of the served image.

FIG. 2F is a block diagram illustrating a method 267 for tracking copies of a served image based on unique identifiers included in the metadata of the served image.

Method 267 includes serving (268) a plurality of copies of a first image to a plurality of client systems. The copies are served in response to requests received from the plurality of client systems. Each of the copies includes modified metadata including a unique identifier. In method 267, the image service system serves copy 1 with unique identifier 1 (270-1) to a first client system, copy 2 with unique identifier 2 (270-2) to a second client system, and copy N with unique identifier N (270-N) to a third client system.

For example, in system 100-B of FIG. 1B, image service system 120 serves copy 1 to client device 135A, copy 2 to client device 135B, and copy 3 to client device 135C. The first client device further publishes copy 1 of the first image. For example, the user associated with the first client device publishes a copy of the first image on a website or a web application using their account. The published copy 1 of the first image is then further copied by other users. For example, users reviewing copy 1 of the first image load copy 1 of the first image via the website or the web application used for publishing copy 1 of the first image, thereby generating further copies of the first image. When loading copy 1 having the unique identifier 1, new copies having the same unique identifier are generated (e.g., copy 1A with unique identifier 1 (270-1A) and copy 1B with unique identifier 1 (270-16).

In some embodiments, copy 1A and copy 1B are loaded by distinct user devices. Similarly, the second client device further publishes copy 2 of the first image. When loading copy 2 having the unique identifier 2, new copies having the same unique identifier are generated (e.g., copies 2A-2C with unique identifier 2 (270-2A through 270-2B)). The client device having the copy 2A of the first image further publishes or distributes copy 2 of the image so that new copies having the same unique identifier are generated (e.g., copies 2D-2G with unique identifier 2 (270-2D through 270-2G). Furthermore, the third client device further publishes copy N of the first image. When loading copy N of having the unique identifier N, new copies having the same unique identifier are generated (e.g., copies NA and NB with unique identifier N (270-NA and 270-NB).

In some embodiments, the method further includes tracking the number of copies having the unique identifiers over the internet. In some embodiments, the tracking includes performing a search based on a unique identifier (e.g., unique identifier 1, 2, or N) on the Internet. In some embodiments, the search includes determining a number of copies of the first image having a particular unique identifier and/or geographical location of the copies of the first image having the particular unique identifier. In some embodiments, the plurality of copies are served simultaneously and, e.g., a number of copies associated with each unique identifier is determined after a certain time (e.g., one hour, 5 hours, 24 hours, one week, etc.).

By such search, the provider of the first image (e.g., an advertiser) may collect data of how many people viewed the first image, what was the geographical distribution of the people who viewed the image. The provider of the first image may further compare the effectiveness of different users in publishing and distributing copies of the first image. For example, as shown in FIG. 2F, copy 2 having unique identifier 2 was distributed most effectively (e.g., copy 2 was distributed to seven different users while copy 1 and copy N were distributed to only two different users). In some embodiments, the tracking is done after a period of time from serving a copy of the image to a client device.

The provider of the first image may further use such search results to determine audience overlap when different users are distributing the first image. In marketing, an advertiser may find different value in having the same target audience reach an image multiple times and also reach the image served via different channels. For example, an advertiser may be associated with two athletes (e.g., Stephen Curry and Tom Brady). Such athletes have their own followers but there may be some overlap with the followers, as many sports fans may follow athletes from different sporting fields. In contrast, the advertiser may be associated with a third, non-athlete, influencer (e.g., a television personality such as Adam Savage). The audience for the third influencer may have little overlap as compared to the audience for the two athletes. By being able to collect data on the overlap between audiences when different users (e.g. athletes vs. non-athletes) are distributing the first image may be valuable for understanding the effectiveness of marketing campaigns.

Figure 3:
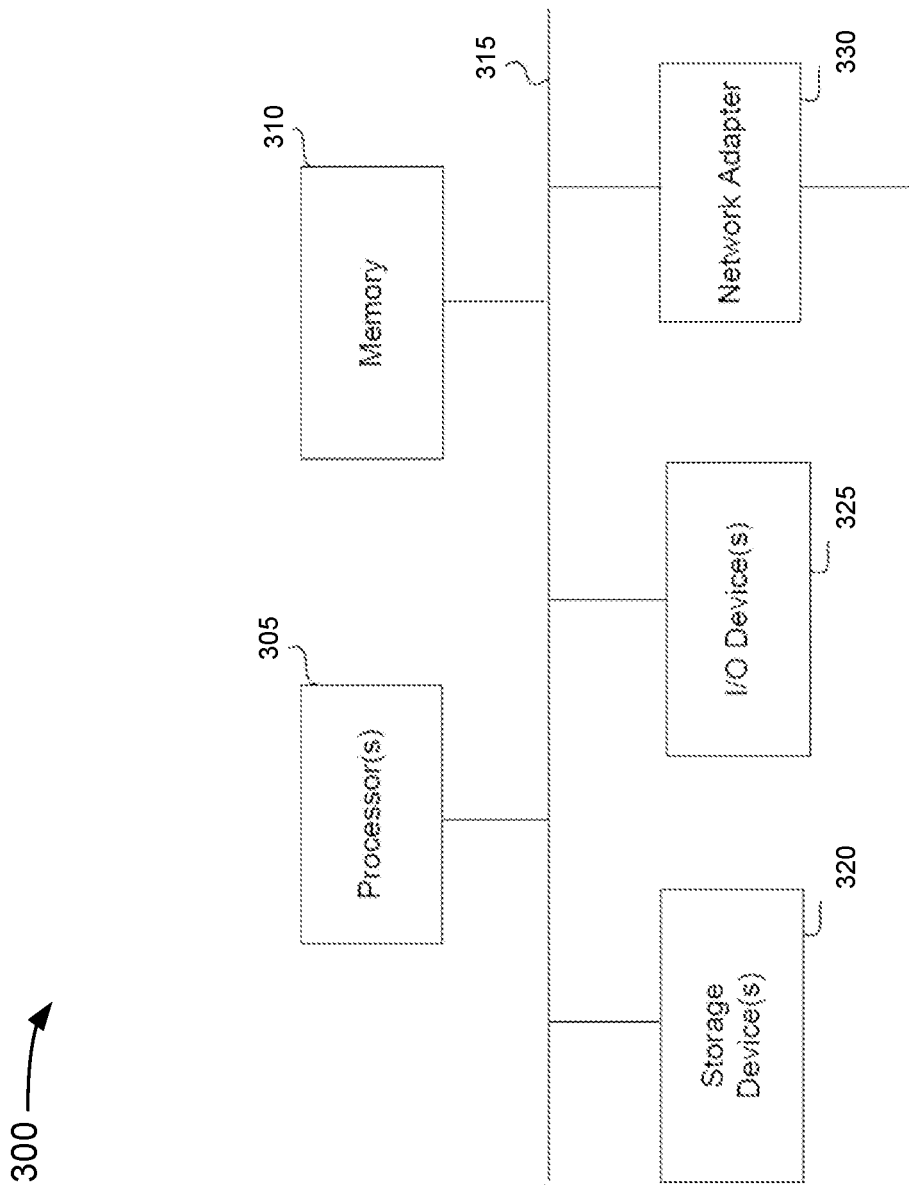
FIG. 3 is a block diagram of a computer system for implementing features of the disclosed technology.

FIG. 3 is a block diagram of a computing system 300 implementing features of the disclosed technology, in accordance with some embodiments. The computing system 300 may be used to implement any of the entities, components or services depicted in the examples of FIGS. 1A-2 (and any other components described in this specification). In some embodiments, computing system 300 corresponds to image service system 120, client system 110, web host 140, and/or client devices 135A, 135B, and 135C. The computing system 300 may include one or more central processing units ("processors") 305, memory 310, input/output devices 325 (e.g., keyboard and pointing devices, display devices), storage devices 320 (e.g., disk drives), and network adapters 330 (e.g., network interfaces) that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 310 and storage devices 320 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 310 can be implemented as software and/or firmware to program the processor(s) 305 to carry out actions described above. In some embodiments, such software or firmware may be initially provided to the processing system 300 by downloading it from a remote system through the computing system 300 (e.g., via network adapter 330).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method comprising:
receiving, at an image service system from a client system, a first request for obtaining an image,
wherein the image is associated with inherent metadata, and
wherein the client system is associated with a type of a client system, the type selected from a desktop computer, a laptop, a tablet computer, and a mobile phone including the type having different manufacturers or models;
serving, by the image service system, the image to the client system in response to the first request for obtaining the image; and
while serving the image to the client system,
determining a context associated with the first request of the image, the context comprising the type of the client system;
determining a predetermined criterion for modifying one or more parameters of inherent metadata, the one or more parameters configured to modify an appearance of the image based on the context associated with the first request of the image, wherein the predetermined criterion is associated with a user of the client system;
modifying, by the image service system, the inherent metadata associated with the image that is served to the client system in accordance with the predetermined criterion to improve display of the image on the type of the client system based on system specifications of that type, wherein:
the inherent metadata of the image stored by the image service system is not modified,
the predetermined criterion is based on the context associated with the first request of the image, the context comprising the type of the client system,
responsive to a determination that the client system is of a first type, the image is modified in accordance with a first predetermined criterion,
responsive to a determination that the client system is of a second type, different of the first type, the first image is modified in accordance with a second predetermined criterion different from the first predetermined criterion, and
the context associated with the first request of the image further comprises a type of a website or a type of an application;
receiving, at the image service system from the client system, a second request for obtaining the image;
re-serving, by the image service system, the image to the client system in response to the second request for obtaining the image; and
while re-serving the image to the client system, modifying, by the image service system, the inherent metadata of the image in accordance with the predetermined criterion, so that the modified metadata associated with the re-served image is different than the modified metadata associated with the served image, wherein the second request for obtaining the image corresponds to a request to reload the image and re-serving the image corresponds to reloading the image on the client system.

2. The method of claim 1, wherein modifying, by the image service system, the inherent metadata associated with the image includes removing information associated with a location where the image was captured.

3. The method of claim 1, wherein modifying, by the image service system, the inherent metadata includes changing pixel dimensions of the image.

4. The method of claim 1, wherein modifying the inherent metadata includes changing an orientation of the image.

5. The method of claim 1, wherein modifying the inherent metadata includes changing a color profile of the image.

6. The method of claim 1, wherein the predetermined criterion is determined based on a user input received by the client system.

7. The method of claim 1, wherein the predetermined criterion is determined based on a user account associated with the first request for obtaining the image.

8. The method of claim 1, wherein modifying the inherent metadata associated with the image, by the image service system, includes changing one or more dimensions of the image or one or more parameters associated with the appearance of the image.

9. The method of claim 1, further including:
receiving, at the image service system from the client system, a request for modifying the predetermined criterion.

10. The method of claim 1, wherein the type of the website or the type of the application comprises a social media type, an advertisement type, a commercial type, or a news type.

11. An image service system comprising:
a processor;
a memory including instructions which, when executed by the processor, cause an image service system to:
receive, from a client system, a first request for obtaining an image, wherein the image is associated with inherent metadata,
wherein the client system is associated with a type of a client system, the type selected from a desktop computer, a laptop, a tablet computer, and a mobile phone including the type having different manufacturers or models;
serve the image to the client system in response to the first request for obtaining the image; and
while serving the image to the client system,
determine a context associated with the first request of the image, the context comprising the type of the client system;
determine a predetermined criterion for modifying one or more parameters of inherent metadata, the one or more parameters configured to modify an appearance of the first image based on the context associated with the first request of the image, wherein the predetermined criterion is associated with a user of the client system;
modify, by the image service system, the inherent metadata associated with the image that is served to the client system in accordance with the predetermined criterion to improve display of the image on the type of the client system based on system specifications of that type, wherein:
the inherent metadata of the image stored by the image service system is not modified, and the predetermined criterion is based on the context associated with the first request of the image, the context comprising the type of the client system, responsive to a determination that the client system is of a first type, the image is modified in accordance with a first predetermined criterion, and responsive to a determination that the client system is of a second type, different of the first type, the image is modified in accordance with a second predetermined criterion different from the first predetermined criterion; and the context associated with the first request of the image further comprises a type of a website or a type of an application;

receive, at the image service system from the client system, a second request for obtaining the image;

re-serve, by the image service system, the image to the client system in response to the second request for obtaining the image; and while re-serving the image to the client system, modifying, by the image service system, the inherent metadata of the image in accordance with the predetermined criterion, so that the modified metadata associated with the re-served image is different than the modified metadata associated with the served image, wherein the second request for obtaining the image corresponds to a request to reload the image and re-serving the image corresponds to reloading the image on the client system.

12. The system of claim 11, wherein
said modifying the inherent metadata includes improving display on the type of the client system based on system specifications of that type.

13. The system of claim 11, wherein modifying, by the image service system, the inherent metadata associated with the image includes removing information associated with a location where the image was captured.

14. The system of claim 11, wherein modifying, by the image service system, the inherent metadata includes changing pixel dimensions of the image.

* * * * *